US012591295B2

(12) United States Patent
Wang et al.

(10) Patent No.: US 12,591,295 B2
(45) Date of Patent: Mar. 31, 2026

(54) UPS BATTERY MANAGEMENT SYSTEM AND CONTROL METHOD THEREOF

(71) Applicant: Lian Zheng Electronics (Shenzhen) Co., Ltd., Shenzhen (CN)

(72) Inventors: Yubo Wang, Guangdong (CN); Yanmei Zhan, Shenzhen (CN); Yahong Xie, Shenzhen (CN)

(73) Assignee: Lian Zheng Electronics (Shenzhen) Co., Ltd., Shenzhen (CN)

( * ) Notice: Subject to any disclaimer, the term of this patent is extended or adjusted under 35 U.S.C. 154(b) by 290 days.

(21) Appl. No.: 18/392,188

(22) Filed: Dec. 21, 2023

(65) Prior Publication Data

US 2024/0211018 A1 Jun. 27, 2024

(30) Foreign Application Priority Data

Dec. 22, 2022 (CN) .......................... 202211656901.7

(51) Int. Cl.
*G06F 1/32* (2019.01)
*G06F 1/3287* (2019.01)
(52) U.S. Cl.
CPC .................................. *G06F 1/3287* (2013.01)
(58) Field of Classification Search
CPC .................................................. G06F 1/3287
See application file for complete search history.

(56) References Cited

U.S. PATENT DOCUMENTS

2013/0314047 A1* 11/2013 Eagle .................... G06F 1/3212
320/127
2022/0009375 A1* 1/2022 Lee ......................... B60L 58/12

FOREIGN PATENT DOCUMENTS

| CN | 108454426 | A | 8/2018 | |
| CN | 111823866 | A | 10/2020 | |
| CN | 112421074 | A | 2/2021 | |
| KR | 20190040838 | A * | 4/2019 | .......... G01R 31/382 |
| KR | 20220073266 | A | 6/2022 | |

* cited by examiner

*Primary Examiner* — Stefan Stoynov
(74) *Attorney, Agent, or Firm* — Stanek Lemon Crouse & Meeks, PA

(57) ABSTRACT

The present invention provides a UPS battery management system, including a micro control unit and a plurality of functional modules connected to the micro control unit. The plurality of functional modules include a first group of functional modules and a second group of functional modules. The first group of functional modules is used for battery checking, and the micro control unit is configured to control the states of the functional modules so that the UPS battery management system has the following working modes: a normal working mode, wherein the micro control unit is configured to turn on the plurality of functional modules; a sleep mode, wherein the micro control unit is configured to turn off the plurality of functional modules; and a timed check mode, wherein the micro control unit is configured to, when in the sleep mode, turn on only the first group of functional modules at regular intervals so as to check a battery. The battery management system of the present invention has well-developed functions, can continuously monitor the state of a battery, has high safety performance and low energy consumption, and is convenient to operate.

13 Claims, 4 Drawing Sheets

B

K

UPS BATTERY MANAGEMENT SYSTEM AND CONTROL METHOD THEREOF

CROSS REFERENCE TO RELATED APPLICATION

This application claims priority to Chinese Patent Application No. 202211656901.7, filed Dec. 22, 2022, the content of which is hereby incorporated herein as if set forth in its entirety.

TECHNICAL FIELD

The present invention belongs to the field of uninterruptible power supply (UPS) batteries, and relates in particular to a UPS battery management system and a control method for a battery management system.

BACKGROUND

With the continuous development of battery technology, more and more devices (e.g., electric vehicles, UPS, etc.) use batteries as energy storage modules. In addition, battery management systems (BMSs) are further required to manage batteries. A battery management system (BMS) is the center for managing and monitoring a power battery, is used for managing, maintaining, and monitoring modules of a battery, and shoulders the important responsibilities for preventing battery overcharge and overdischarge, extending the service life of the battery, and facilitating the normal operation of the battery.

The design of most UPS batteries currently on the market is as shown in FIG. 1, wherein a switch K controls an output circuit of a battery B. When the switch K is closed, the battery B can supply power to the outside. When the switch K is open, power supply from the battery B to the outside is cut off.

The BMS of the battery B has two working modes: an on mode and an off mode. In the on mode, the BMS manages and monitors the battery B. In the off mode, the BMS does not manage or monitor the battery B. In addition, the BMS can also operate to turn on or turn off the switch K so as to control the power supply from the battery B to the outside.

The BMS is a system combining software and hardware, and is typically powered by a battery, preferably a lithium battery, and so the BMS continuously consumes energy of the battery while managing and monitoring the battery. During storage and transportation of a battery device, in order to reduce energy consumption of the battery, the BMS is typically turned off. In these situations, a relatively long time is required to restart the BMS at the end of storage or transportation, which is extremely inconvenient. In addition, the BMS in the off mode cannot record the state of the battery during a storage and transportation process, therefore emergencies that occur during the process cannot be dealt with, resulting in low safety performance.

For example, when one UPS is in use, the BMS is in the on mode and monitors and manages the battery. After use is discontinued, a control switch of the BMS needs to be turned off in order to reduce energy consumption of the battery. At which time, all functions of the BMS are deactivated, and the battery cannot be monitored or managed, and so emergencies occurring in the battery when the BMS is deactivated cannot be detected, resulting in poor safety. Currently, battery explosion incidents during UPS storage processes are not uncommon, and therefore there is a particular need for a BMS that is capable of both reducing energy consumption and monitoring continuously.

Currently, the prior art provides a solution in which a sleeping BMS is woken up in real time to perform battery checking.

CN 108454426 A discloses a system and method for automatically monitoring a power battery of a purely electric ship, wherein when a purely electric ship is turned off and positioned, a shipborne terminal wakes up a BMS at regular intervals to operate so as to perform information monitoring on a power battery pack and upload the information to a remote monitoring platform to process the information.

CN 111823866 A discloses a method and apparatus for inspection and control of a high-voltage power storage battery of an electric vehicle, wherein a battery management system is woken up regularly at a preset time interval, and the battery management system inspects a battery after being woken up.

CN 112421074 A discloses a fuel cell heat preservation system and method for a hydrogen energy vehicle, an electronic device, and a storage medium, wherein after an entire vehicle is powered off, a vehicle control unit sends, to a battery management system, an instruction for entering a sleep state and self-waking up at regular intervals. When in an awake state, the battery management system acquires a battery pack temperature measured by a battery temperature sensor.

KR 20220073266 A discloses a device and method for checking the state of a high-voltage battery when an electric vehicle is in a sleep mode.

However, none of these prior art documents relate to the field of UPS. In addition, none of these prior art documents disclose or teach waking up only some functions of a BMS in a sleep mode, and the problems of imperfect BMS functions, long elapsed time, and high energy consumption exist.

SUMMARY

Therefore, the objective of the present invention is to overcome the above-mentioned defects in the prior art, and to provide a UPS battery management system, comprising a micro control unit and a plurality of functional modules connected to the micro control unit, the plurality of functional modules comprising a first group of functional modules and a second group of functional modules, the first group of functional modules being used for battery checking, and the micro control unit being configured to control the states of the functional modules so that the UPS battery management system has the following working modes:

a normal working mode, wherein the micro control unit is configured to turn on the plurality of functional modules;

a sleep mode, wherein the micro control unit is configured to turn off the plurality of functional modules; and a timed check mode, wherein the micro control unit is configured to, when in the sleep mode, turn on only the first group of functional modules at regular intervals so as to check a battery.

In the UPS battery management system according to the present invention, preferably, the plurality of functional modules each comprise an ADC sampling module, an EEPROM storage module, a clock module, a switching power supply module, a communication module, and a GPIO control module.

In the UPS battery management system according to the present invention, preferably, the ADC sampling module, the clock module, the switching power supply module, and the GPIO module are configured to constitute the first group of functional modules.

In the UPS battery management system according to the present invention, preferably, the EEPROM storage module and the communication module are configured to constitute the second group of functional modules.

In the UPS battery management system according to the present invention, preferably, checking is performed according to a predetermined time period in the timed check mode.

In the UPS battery management system according to the present invention, preferably, checking is performed according to a variable time period in the timed check mode.

In the UPS battery management system according to the present invention, preferably, a next timed check occasion is determined on the basis of one or more previous timed check results.

The UPS battery management system according to the present invention preferably further comprises a wake-up source configured to send out a wake-up signal to activate the normal working mode.

In the UPS battery management system according to the present invention, preferably, the wake-up source is configured to send out a wake-up signal in at least one among the following scenarios: battery charging, battery discharging, or communication between the UPS battery management system and a host.

In the UPS battery management system according to the present invention, preferably, the sleep mode is activated when the wake-up signal is not received within a predetermined time.

In another aspect, provided in the present invention is a control method for the UPS battery management system according to the present invention, the control method controlling the UPS battery management system to switch between a normal working mode, a sleep mode, and a timed check mode, and comprising the following steps:

S1: when the battery management system is in the normal working mode, determining whether to activate the sleep mode, and if so, turning off all functions of the UPS battery management system;

S2: when the sleep mode is activated, determining whether to perform a timed check, and if so, turning on the first group of functional modules of the UPS battery management system;

S3: when battery checking is performed, determining whether a battery is faulty, and if not, returning to the sleep mode; or if so, returning to the sleep mode after performing a protection action; and S4: when battery checking is not performed, determining whether to wake up the UPS battery management system, and if so, resuming all of the functions of the UPS battery management system and returning to the normal working mode; or if not, returning to the sleep mode.

In yet another aspect, provided in the present invention is a computer-readable storage medium, wherein the computer-readable storage medium has a computer program stored thereon, and the computer program is executed to implement the control method for the UPS battery management system described in the present invention.

In yet another aspect, provided in the present invention is an electronic device, comprising a processor and a memory, wherein the memory is used to store executable commands, and the processor is configured to implement the control method for the UPS battery management system described in the present invention by executing the executable commands.

Compared to the prior art, the UPS battery management system of the present invention has well-developed functions, can continuously monitor the state of a battery, has high safety performance and low energy consumption, and is convenient to operate.

BRIEF DESCRIPTION OF THE DRAWINGS

Embodiments of the present invention are further described below with reference to the accompanying drawings.

DETAILED DESCRIPTION OF THE EMBODIMENTS

In order for the objectives, technical solutions and advantages of the present invention to be clearer, the present invention is further described in detail below by means of specific embodiments with reference to the accompanying drawings. It should be understood that the specific embodiments described herein are only intended to explain the present invention, rather than to limit the present invention.

Figure 2:
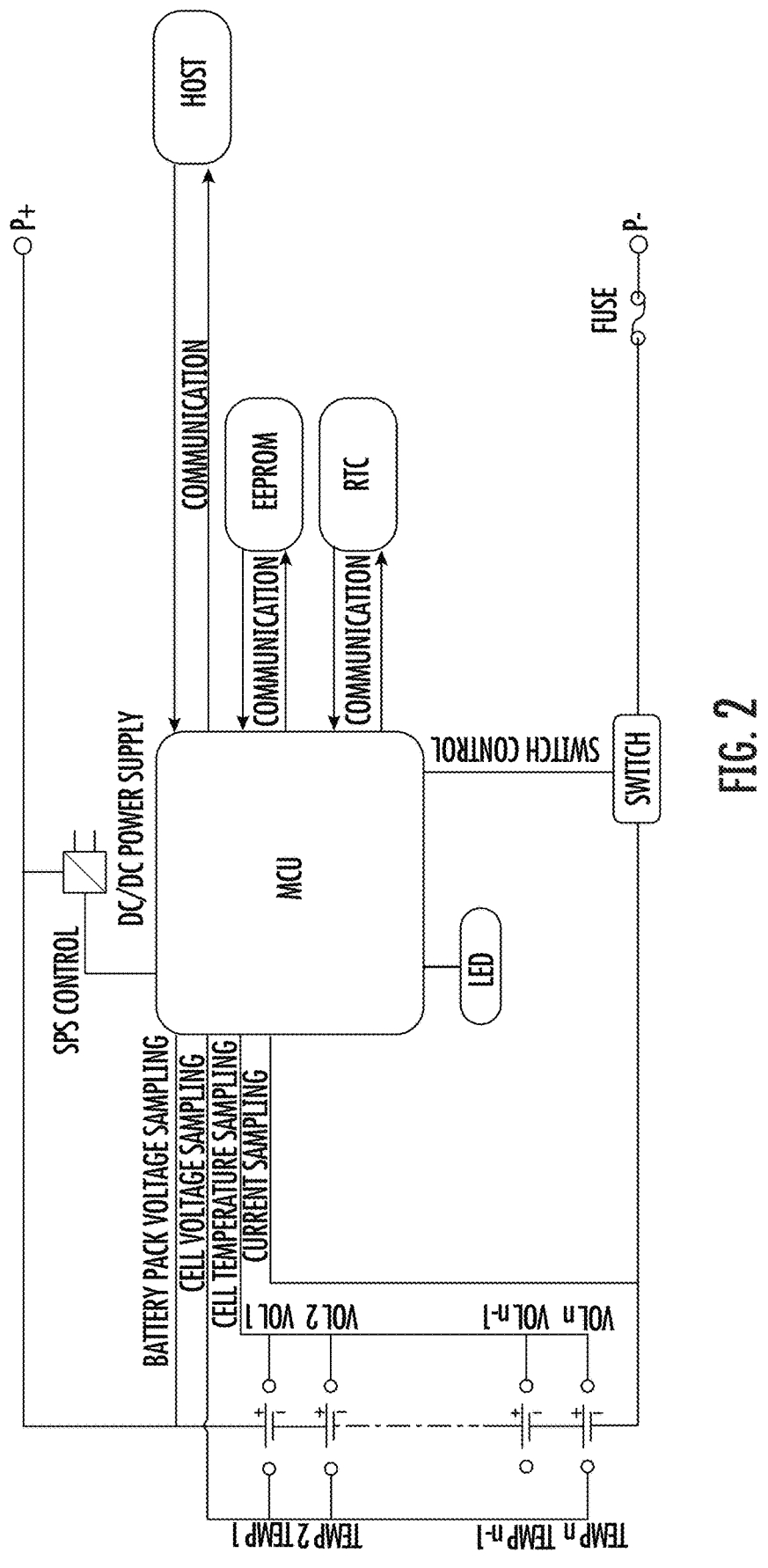
FIG. 2 is a hardware architecture diagram of a battery management system according to an embodiment of the present invention.

Referring to the hardware architecture diagram of a BMS for a UPS shown in FIG. 2, the BMS includes a micro control unit (MCU). Different ports of the MCU are used to control the following basic functions of the BMS:

1) sampling of cell voltage, battery pack voltage, cell temperature, and current;

2) general-purpose input/output (GPIO) control, including switching power supply (SPS) control, switch control, LED control, and the like;

3) a function of communicating with a host;

4) a function of communicating with internal devices such as an electrically erasable programmable read-only memory (EEPROM), a real-time clock (RTC), and the like; and 5) a clock function using a crystal oscillator as a clock source.

Those skilled in the art can understand that the BMS is not limited to the basic functions described above. In the present invention, the functions of the BMS are implemented by a plurality of functional modules.

For a conventional BMS, when the BMS is in a working mode, all functions are enabled, and when the BMS is in an off mode, all functions are disabled.

In general, main power consumption sources of a BMS when working and corresponding power consumption reduction solutions are shown in Table 1 below.

TABLE 1

| | BMS Power Consumption Sources | Corresponding Power Consumption Reduction Solutions |
|---|---|---|
| 1 | Battery self-discharging | Unable to reduce |
| 2 | MCU power consumption | MCU low power mode |
| 3 | Peripheral component power consumption | Pause |
| 4 | Peripheral circuit power consumption | Turn off power supply |

In these four power consumption sources, power consumption of the battery self-discharging cannot be reduced, but accounts for a very low proportion of power consumption. Therefore, the present invention mainly focuses on power consumption of peripheral components and peripheral circuits.

Figure 1:
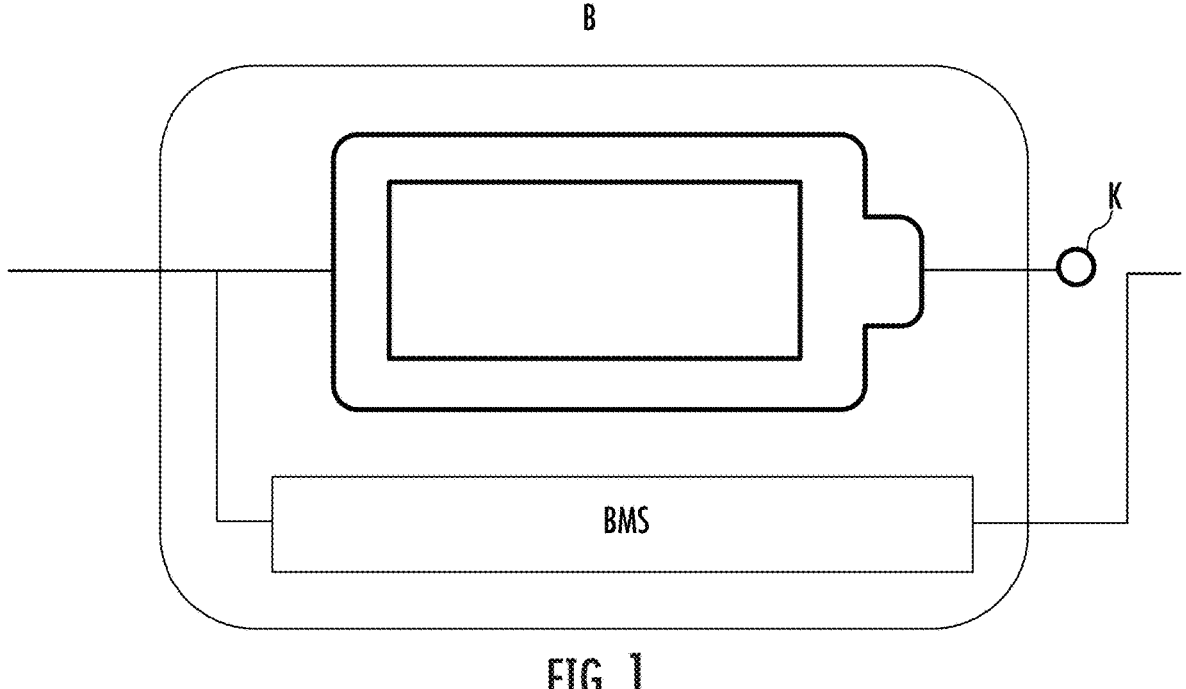
FIG. 1 is a battery design of the prior art.

In order to improve the management and monitoring capability of the BMS and to reduce power consumption of the BMS, provided in an embodiment of the present invention is a UPS battery management system (BMS), including the following working modes:

1) a normal working mode, in which all functions of the BMS are enabled, that is, all functional modules are turned on;

2) a sleep mode, in which all of the functional modules of the BMS are disabled, that is, all of the functional modules are turned off, and the MCU stops working, wherein preferably, in said mode, the state in which the battery can supply power to the outside is maintained. For example, a switch K in FIG. 1 remains in a closed state; and 3) a timed check mode, in which the BMS at regular intervals, for example periodically, turns on only some of the functional modules, including an analog-to-digital conversion (ADC) sampling function, a clock function, a switching power supply function, and a GPIO function so as to check battery state at regular intervals.

In the present invention, functional modules for checking battery state constitute the first group of functional modules, including, for example, an analog-to-digital conversion (ADC) sampling module, a clock module, a switching power supply module, and a GPIO module; meanwhile, functional modules not for checking battery state constitute the second group of functional modules, including, for example, an EEPROM storage module and a communication module. In the timed check mode, only the first group of functional modules of the BMS are turned on.

Functions provided in the above three working modes are shown in Table 2 below.

TABLE 2

| | BMS Functions | Normal Working Mode | Sleep Mode | Timed Check Mode |
|---|---|---|---|---|
| 1 | ADC sampling | On | Off | On |
| 2 | EEPROM storage | On | Off | Off |
| 3 | Clock mode | On | Off | On |
| 4 | Switching power supply | On | Off | On |
| 5 | Communication | On | Off | Off |
| 6 | GPIO Control | On | Off | On |

Figure 3:
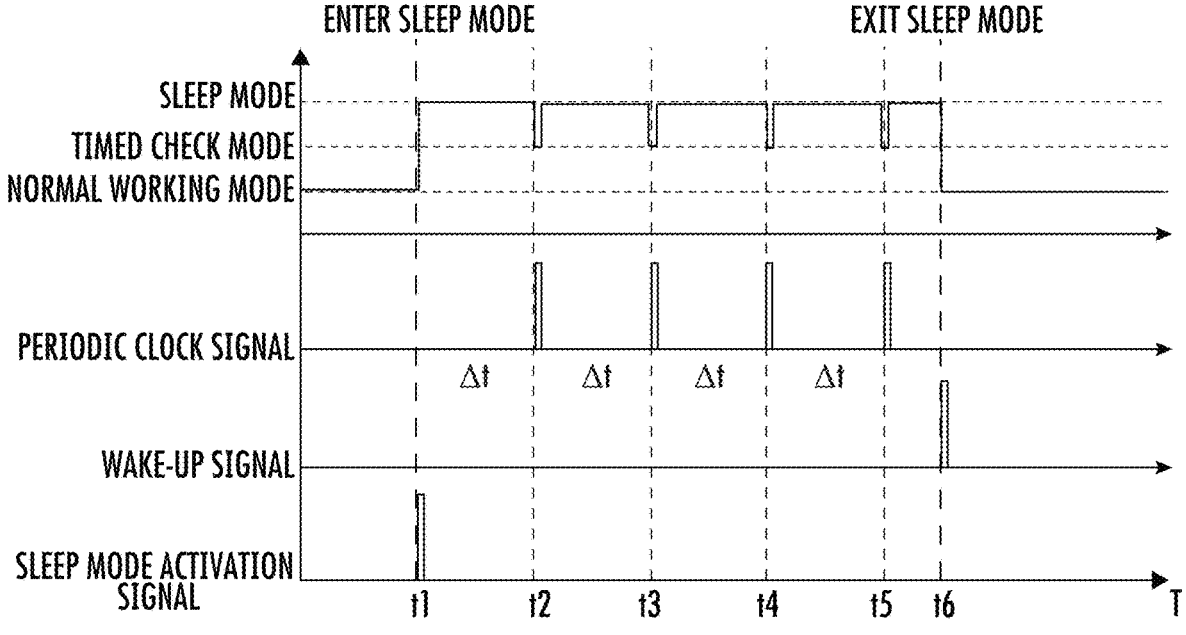
FIG. 3 is a working mode switching time sequence of a battery management system according to an embodiment of the present invention.

A working process of the BMS of the present invention is introduced with reference to the time sequence of switching between the three working modes of the BMS according to an embodiment of the present invention as shown in FIG. 3, and FIG. 3 shows the three working modes and corresponding enabling signals.

During a time period from 0 to t1, the BMS is in the normal working mode, at which time, the UPS works normally. In said mode, all of the functions of the BMS are turned on, and the BMS performs real-time management and monitoring on a battery.

At moment t1, the MCU controls the BMS to enter the sleep mode. In the sleep mode, all of the functions of the BMS are turned off, but an input/output state of the battery is maintained, thereby ensuring that an electrical device can be started in a battery mode at any time.

After entering the sleep mode, the BMS performs a timed check by using $\Delta t$ as the period. At moments $t2=t1+\Delta t$, $t3=t1+2\Delta t$, $t4=t1+3\Delta t$, and $t5=t1+4\Delta t$, a periodic clock signal is sent out, and the timed check mode is turned on. That is, the ADC sampling function, the clock function, the switching power supply function, and the GPIO function of the BMS are activated to check battery state. The BMS returns to the sleep mode if the battery state is normal, for example, an ADC sampling result is within a threshold range, for example, the battery current is within a range of $I_0\pm\Delta I$, where $I_0$ is a standard current value, and $\Delta I$ is an allowed fluctuation value. Remedial action is performed if the battery state is abnormal, for example, an ADC sampling result exceeds a threshold, for example, fluctuation of a current sample around the standard value exceeds the allowed value $\Delta I$.

At moment t6, a wake-up signal is sent out, and the normal working mode of the BMS is activated again. Different external environmental signals, such as a charging or discharging behavior and behavior of communication between the BMS and the host, will wake up the BMS. These external signals wake up the BMS by triggering different signal receiving modules of the BMS. The host here preferably refers to an electrical device. The discharging behavior includes, for example, any behavior of the battery related to supplying power to the outside.

Those skilled in the art can understand that for the sleep mode, the behavior may be initiated by the MCU upon receiving a signal instruction for activating the sleep mode. A signal for activating the sleep mode includes, for example, a turn-off signal of a new energy vehicle. The behavior may also be automatically initiated by the MCU if no wake-up signal is received within a predetermined time. The predetermined time is preset according to an application scenario.

According to working scenarios of the BMS, BMS wake-up scenarios and MCU wake-up sources are shown in Table 3.

TABLE 3

| | BMS Wake-up Scenarios | MCU Wake-up Sources |
|---|---|---|
| 1 | Battery charging | A GPIO input signal or a current sample is detected in a timed check. |
| 2 | Battery discharging | A GPIO input signal or a current sample is detected in a timed check. |
| 3 | Communication with the host | A communication signal is detected. |

Figure 4:
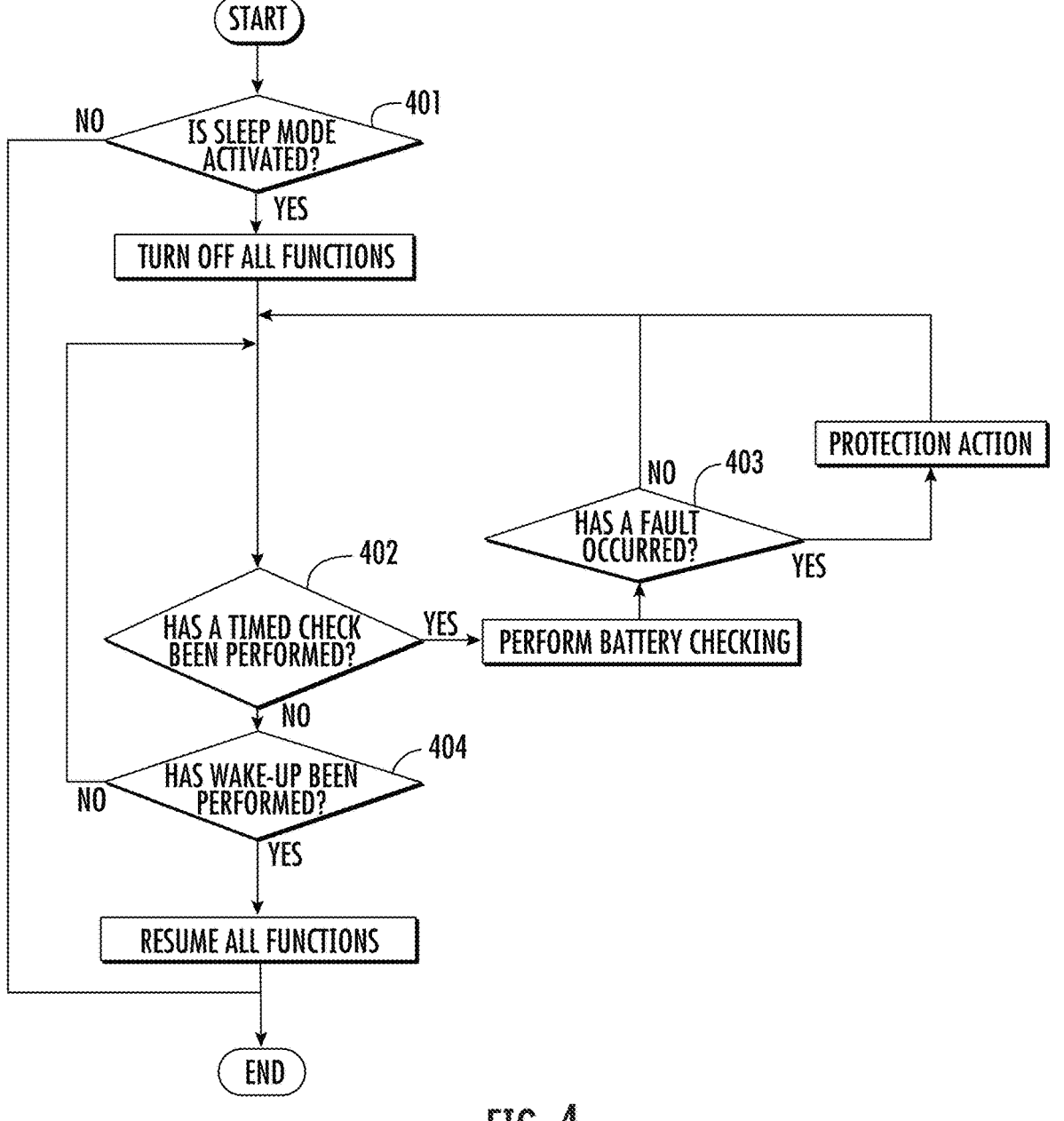
FIG. 4 is a workflow chart of a battery management system according to an embodiment of the present invention.

Looking at the workflow of the BMS of the present invention with reference to FIG. 4, the workflow generally includes the following four pieces of determination logic:

Determination 401: when the BMS is in the normal working mode, determining whether to activate the sleep mode, and if so, turning off all functions of the BMS.

Determination 402: when the sleep mode is activated, determining whether to perform a timed check, and if so, performing battery checking.

Determination 403: when battery checking is performed, determining whether the battery is faulty, and if not, returning to the sleep mode; or if so, returning to the sleep mode after performing a protection action.

Determination 404: when battery checking is not performed, determining whether to wake up the BMS, and if so, resuming all of the functions of the BMS and returning to the normal working mode; or if not, returning to the sleep mode.

In order to verify the effect of the present invention, power consumption of the BMS in the normal working mode and the sleep mode (including the timed check) according to an embodiment was tested. The power consumption in the normal working mode was 30.62 mA, and the power consumption in the sleep mode was 196 µA. Thus, the power consumption in the sleep mode was much lower than the power consumption in the normal working mode, and the timed check interspersed in the sleep mode ensured that the battery was monitored. Therefore, the BMS of the present invention achieves both energy consumption reduction and continuous monitoring.

In another embodiment of the present invention, also provided is a control method for the BMS in the foregoing embodiment. The control method controls the BMS to switch between the normal working mode, the sleep mode, and the timed check mode.

In another embodiment of the present invention, checking is performed according to a variable time period in the timed check mode. Preferably, the next check time is determined according to one or more previous timed check results. For example, at the beginning of the sleep mode, a timed check is performed every half hour. If ADC sampling results of three consecutive timed checks are all stable, for example, the fluctuation of a current sample around a standard value $I_0$ is less than $\Delta I/2$, $\Delta I/3$, $\Delta I/4$, or the like, or even remains constant, and then the interval of the timed check is extended. For example, a check is performed every hour. If ADC sampling results continuously remain stable, the interval of the check is further extended. If the fluctuation of an ADC sampling result of a previous timed check exceeds a predetermined value, for example, the fluctuation of a current sample around the standard value $I_0$ is greater than $\Delta I/2$, $\Delta I/3$, $\Delta I/4$, or the like, then the interval of the next check is shortened. As another example, the fluctuation value of sample data and a corresponding timed check time interval are configured in advance, and the time of the next timed check is adjusted in real time according to the fluctuation value of ADC sample data of a current check.

In the present invention, the BMS has battery checking functions and non-battery checking functions such as the communication function and the storage function. In the timed check mode of the BMS, only the functional modules for battery checking (the first group of functional modules), i.e., some of the functions of the BMS in the normal working mode, are activated, thereby significantly reducing energy consumption and check time.

In another embodiment of the present invention, also provided is a computer-readable storage medium, which has a computer program or executable instructions stored thereon, and when executed, the computer program or executable instructions implement the control of the BMS as described in the preceding embodiments, the implementation principles of which are similar, and are not repeated here. In the embodiments of the present invention, the computer-readable storage medium may be any tangible medium capable of storing data and being read by a computing apparatus. Examples of computer-readable storage media include a hard disk drive, a network attached storage (NAS), a read-only memory, a random access memory, a CD-ROM, a CD-R, a CD-RW, a magnetic tape, and other optical or non-optical data storage apparatuses. The computer-readable storage medium may also include a computer-readable medium distributed on a network coupled computer system so as to store and execute computer programs or instructions in a distributed manner.

In yet another embodiment of the present invention, further provided is an electronic device, including a processor and a memory, wherein the memory is used to store executable instructions executable by the processor, wherein the processor is configured to execute executable instructions stored on the memory, and the executable instructions, when executed, implement the control of the BMS described in the preceding embodiments, the implementation principles of which are similar, and are not repeated here.

Reference in the present description to "various embodiments", "some embodiments", "one embodiment", "an embodiment" or the like refer to a particular feature, structure, or property described in connection with the embodiment included in at least one embodiment. Therefore, appearances of the phrases "in various embodiments," "in some embodiments," "in one embodiment," "in an embodiment" or the like in various places throughout the description are not necessarily referring to the same embodiment. Moreover, particular features, structures, or properties may be combined in any suitable manner in one or more embodiments. Therefore, particular features, structures, or properties shown or described in connection with one embodiment may be combined, in whole or in part, with features, structures, or properties of one or more other embodiments, as long as the combination is not non-logical or inoperable.

The expressions of terms "including" and "having" and terms of similar meaning in the present description are intended to cover non-exclusive inclusions. For example, processes, methods, systems, products, or devices that include a series of steps or units are not limited to steps or units that are listed, but may further optionally include steps or units that are not listed or may further optionally include steps or units inherent to these processes, methods, products, or devices. "A" or "an" also does not exclude the plural form. In addition, the individual elements in the drawings of the present application are merely illustrative and are not drawn to scale.

Although the present invention has been described through preferred embodiments, the present invention is not limited to the embodiments described herein, but includes various changes and variations made without departing from the scope of the present invention.

The invention claimed is:

1. A UPS battery management system, comprising a micro control unit and a plurality of functional modules connected to the micro control unit, the plurality of functional modules comprising a first group of functional modules and a second group of functional modules, the first group of functional modules being used for battery checking, and the micro control unit being configured to control the states of the functional modules so that the UPS battery management system has the following working modes:

a normal working mode, wherein the micro control unit is configured to turn on the plurality of functional modules;

a sleep mode, wherein the micro control unit is configured to turn off the plurality of functional modules; and a timed check mode, wherein the micro control unit is configured to, when in the sleep mode, turn on only the first group of functional modules at regular intervals so as to check battery.

2. The UPS battery management system according to claim 1, wherein the plurality of functional modules comprise an ADC sampling module, an EEPROM storage module, a clock module, a switching power supply module, a communication module, and a GPIO control module.

3. The UPS battery management system according to claim 2, wherein the ADC sampling module, the clock module, the switching power supply module, and the GPIO module to constitute the first group of functional modules.

4. The UPS battery management system according to claim 2, wherein the EEPROM storage module and the communication module constitute the second group of functional modules.

5. The UPS battery management system according to claim 1, wherein the battery checking is performed according to a predetermined time period in the timed check mode.

6. The UPS battery management system according to claim 1, wherein the battery checking is performed according to a variable time period in the timed check mode.

7. The UPS battery management system according to claim 6, wherein the next timed battery check occasion is determined on the basis of one or more previous timed battery check results.

8. The UPS battery management system according to claim 1, further comprising a wake-up source configured to send out a wake-up signal to activate the normal working mode.

9. The UPS battery management system according to claim 8, wherein the wake-up source is configured to send out a wake-up signal in at least one among the following scenarios: battery charging, battery discharging, or communication between the UPS battery management system and a host.

10. The UPS battery management system according to claim 8, wherein the sleep mode is activated when the wake-up signal is not received within a predetermined time.

11. A control method for the UPS battery management system according to claim 1, the control method controlling the UPS battery management system to switch between the normal working mode, the sleep mode, and the timed check mode, and comprising the following steps:

S1: when the UPS battery management system is in the normal working mode, determining whether to activate the sleep mode, and if so, turning off all functions of the UPS battery management system;

S2: when the sleep mode is activated, determining whether to perform a timed check, and if so, turning on the first group of functional modules of the UPS battery management system to perform battery checking;

S3: when battery checking is performed, determining whether the battery is faulty, and if not, returning to the sleep mode; or if so, returning to the sleep mode after performing a protection action; and S4: when the timed check is not performed, determining whether to wake up the UPS battery management system, and if so, resuming all of the functions of the UPS battery management system and returning to the normal working mode; or if not, returning to the sleep mode.

12. A non-transitory computer-readable storage medium, wherein the computer-readable storage medium has a computer program stored thereon, and the computer program is executed to implement the control method for the UPS battery management system described in claim 11.

13. An electronic device, comprising a processor and a memory, wherein the memory is used to store executable commands, and the processor is configured to implement the control method for the UPS battery management system described in claim 11 by executing the executable commands.

* * * * *